(12) United States Patent
Wulf et al.

(10) Patent No.: US 12,043,307 B2
(45) Date of Patent: Jul. 23, 2024

(54) SENSOR SYSTEM FOR A UTILITY VEHICLE AND FIFTH-WHEEL COUPLING SYSTEM, UTILITY VEHICLE COMPRISING SAID SENSOR SYSTEM, AND METHOD FOR SAME

(71) Applicant: WABCO GmbH, Hannover (DE)

(72) Inventors: Oliver Wulf, Neustadt (DE); Klaus Plaehn, Seelze (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 832 days.

(21) Appl. No.: 17/253,630

(22) PCT Filed: Jun. 3, 2019

(86) PCT No.: PCT/EP2019/064275
§ 371 (c)(1),
(2) Date: Dec. 18, 2020

(87) PCT Pub. No.: WO2019/243025
PCT Pub. Date: Dec. 26, 2019

(65) Prior Publication Data
US 2021/0171100 A1     Jun. 10, 2021

(30) Foreign Application Priority Data

Jun. 20, 2018 (DE) ..................... 10 2018 114 851.8

(51) Int. Cl.
*B62D 15/02* (2006.01)
*B60D 1/62* (2006.01)
(Continued)

(52) U.S. Cl.
CPC ............. *B62D 15/023* (2013.01); *B60D 1/62* (2013.01); *B62D 53/0842* (2013.01); *G01B 5/0004* (2013.01); *G01B 5/24* (2013.01)

(58) Field of Classification Search
CPC .. B62D 15/023; B62D 53/0871; B60D 1/015; B60D 1/58; B60D 1/62; B60T 8/248;
(Continued)

(56) References Cited

U.S. PATENT DOCUMENTS 5,001,639 A   3/1991   Breen
5,912,616 A   6/1999   Valentino
(Continued)

FOREIGN PATENT DOCUMENTS

CN   101500883 A   8/2009
CN   101565060 A   10/2009
(Continued)

*Primary Examiner* — Minnah L Seoh
*Assistant Examiner* — Christopher B Wehrly
(74) *Attorney, Agent, or Firm* — LEYDIG, VOIT & MAYER, LTD.

(57) ABSTRACT

A sensor system, for determining an angular change between a utility vehicle and a coupled vehicle trailer, includes a sensor unit having a wheel mounted so as to be rotatable about an axis, and a rotary encoder connected to the wheel and configured to detect a change in position of the wheel. The sensor system further includes a mount having at least one first fixed part configured to connect the sensor system to the utility vehicle or a part thereof, and at least one movable part connected to the sensor unit and mounted so as to be movable on the fixed part. In addition, the sensor system includes a positioning mechanism configured to provide sprung bearing of the movable part in an operating position such that the wheel of the sensor unit can be moved into contact with a vehicle trailer or a part of the vehicle trailer.

18 Claims, 4 Drawing Sheets

(51) Int. Cl.
*B62D 53/08* (2006.01)
*G01B 5/00* (2006.01)
*G01B 5/24* (2006.01)

(58) Field of Classification Search
CPC ...... G01B 5/0002; G01B 5/0004; G01B 5/14; G01B 5/24; G01B 2219/35579; G01B 2219/33329; G01B 2219/3719
USPC ...................................... 280/422, 432, 446.1
See application file for complete search history.

(56) References Cited

U.S. PATENT DOCUMENTS

| | | |
|---|---|---|
| 9,027,949 B2 | 5/2015 | Reimer |
| 2008/0185228 A1 | 8/2008 | Gallego et al. |
| 2009/0267321 A1 | 10/2009 | Alguera et al. |
| 2015/0158355 A1* | 6/2015 | Alldredge ............... B62D 53/08 280/434 |
| 2018/0057052 A1* | 3/2018 | Dodd ..................... B62D 63/08 |

FOREIGN PATENT DOCUMENTS

| | | |
|---|---|---|
| DE | 4021717 A1 | 1/1992 |
| DE | 69818464 T2 | 5/2004 |
| DE | 102010033641 A1 | 2/2012 |
| DE | 102014224425 A1 | 6/2016 |
| DE | 102016012663 A1 | 6/2017 |
| EP | 0471286 A1 | 2/1992 |
| EP | 2899101 A1 | 7/2015 |

* cited by examiner

SENSOR SYSTEM FOR A UTILITY VEHICLE AND FIFTH-WHEEL COUPLING SYSTEM, UTILITY VEHICLE COMPRISING SAID SENSOR SYSTEM, AND METHOD FOR SAME

CROSS REFERENCE TO RELATED APPLICATIONS

This application is a U.S. National Phase Application under 35 U.S.C. § 371 of International Application No. PCT/EP2019/064275, filed on Jun. 3, 2019, and claims benefit to German Patent Application No. DE 10 2018 114 851.8, filed on Jun. 20, 2018. The International Application was published in German on Dec. 26, 2019 as WO 2019/243025 A1 under PCT Article 21(2).

FIELD

The invention relates to the field of utility vehicles and, in particular, to determining an articulation angle between a utility vehicle and a vehicle trailer towed by the utility vehicle.

BACKGROUND

In the field of utility vehicles it is known to record measured values in order to determine an operating state or driving state of the utility vehicle itself or else of a vehicle trailer which is towed by the utility vehicle. The measured values relating to the current operating state or driving state can then be used in driving assistant systems or safety systems in order to assist or inform the vehicle driver, or to counteract unstable or unsafe states automatically when such states occur.

In addition to the direct determination of measured values with sensors it is also known to estimate variables or variable quantities indirectly using other measured values or known quantities or to model them by means of the latter. An example of this is the determination of an articulation angle between a utility vehicle and a vehicle trailer which is towed by the utility vehicle. Such an articulation angle is modeled, for example, taking into account the measured speed, measured yaw rates of the utility vehicle and fixed geometric parameters. The articulation angle which is determined in this way can be taken into account, for example, in safety systems of the vehicle such as, for example, an electronic stability control (ESP [Electronic Stability Program]).

The monitoring of an articulation angle preferably also serves to warn a vehicle driver if the vehicle trailer has jackknifed too much in comparison with the utility vehicle, for example during reverse travel through tight bends. As a result, for example, it is possible to avoid connecting cables or connecting lines from being torn off between the motor vehicle and the vehicle trailer if the vehicle driver reacts to the warning.

In addition, a determined articulation angle between a utility vehicle and a vehicle trailer can be used to permit partial autonomous driving of the utility vehicle to which a vehicle trailer is coupled, even in a direction of reverse travel.

Sensor arrangements or sensor systems are known from the prior art, in order also to permit a direct articulation angle measurement in comparison with absolute articulation angles which are determined indirectly by means of the modeling.

Such sensors can be implemented, for example, as optical sensors, wherein they have the disadvantage that as a result of soiling they do not supply measured values or to a certain extent supply incorrect measured values. Furthermore, sensors are known which are arranged on the utility vehicle and are in direct contact with the vehicle trailer, for example through a wheel. Therefore, by means of these sensors at least one relative movement of the vehicles with respect to one another can be measured.

However, the sensors just mentioned can frequently be used only in a specific measuring range of the articulation angle, since regions in which the articulation angle can be measured exclusively independently of other relative movement between the vehicle trailer and the utility vehicle are available only to a limited degree.

EP 0 471 286 B1 describes, for example, integrating a roller sensor into an opening of a fifth wheel of a fifth-wheel coupling. However, such a solution involves the problem that owing to the opening, stability of the fifth wheel has to be ensured through additional reinforcement. On the other hand, a trailer coupling which is present and which is configured, for example, as a fifth-wheel coupling cannot be retrofitted by means of this solution, since a stability-reducing opening for the sensor cannot be readily formed.

SUMMARY

In an embodiment, the present invention provides a sensor system for determining an angular change between a utility vehicle having a trailer coupling and a coupled vehicle trailer. The sensor system includes a sensor unit having a wheel mounted so as to be rotatable about an axis, and a rotary encoder connected to the wheel and configured to detect a change in position of the wheel. The sensor system further includes a mount having at least one first fixed part configured to connect the sensor system to the utility vehicle or a part thereof, and at least one movable part connected to the sensor unit and mounted so as to be movable on the fixed part. In addition, the sensor system includes a positioning mechanism at least configured to provide sprung bearing of the movable part in an operating position in such a way that the wheel of the sensor unit can be moved into contact with a vehicle trailer or a part of the vehicle trailer. The mount is adapted to arrange, at least in the operating position, the wheel of the sensor unit outside a support face of the trailer coupling, next to the support face, in such a way that in the operating position a contact face of the wheel is configured to be moved into a plane formed by the support face, into a region over which a baseplate of the vehicle trailer can move.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The present disclosure describes a sensor system which counters problems of the prior art. In particular, a sensor system is described that can be retrofitted without reducing stability of a trailer coupling which is present.

For this purpose, a sensor system is provided for determining a change in angle between the utility vehicle and a vehicle trailer. The utility vehicle is, for example, a tractor and the vehicle trailer is, for example, a semi-trailer. The sensor system comprises a sensor unit, a mount and a positioning mechanism.

The sensor unit comprises a wheel which is mounted so as to be rotatable about an axis, and a rotary encoder which is connected to the wheel, in order to detect a change in position of the wheel. The term wheel is selected here in order to generally describe a rotational body which can rotate about an axis. Therefore, the term does not constitute a limitation of the geometric shape. The wheel also comprises, for example, a spherical body or the like which is mounted on a rotational axis.

The mount comprises at least one fixed part for mounting the system on the utility vehicle or a part of the utility vehicle, and at least one movable part which is connected to the sensor unit and is movably mounted on the fixed part. The movable part is preferably rotatably mounted on the fixed part. According to one alternative, the movable part is mounted in a linearly displaceable fashion on the fixed part.

The positioning mechanism is configured to mount the movable part at least in an operating position, preferably an operating position range. This mounting is embodied as a sprung mounting. The movable part is therefore spring-mounted so that the movable part is arranged in different positions within the operating position range by means of the positioning mechanism as a function of a force applied to the suspension mounting. In this case, the positioning mechanism serves to mount the movable part, at least in the operating position, in particular so that the wheel of the sensor unit which is connected to the movable part can be brought into contact with a vehicle trailer with a spring force.

The operating position denotes here in particular the position of the wheel so that the contact area which runs around the wheel rests in a plane with the support face or function linings of the support face.

In this context, the present disclosure makes use of the knowledge that usually a larger area is selected for a contact area of the vehicle trailer, that is to say a region of a contact plate of the vehicle trailer which is adapted to rest on a support face of a trailer coupling, than the support face itself.

This contact region of the contact trailer is generally embodied in a flat fashion and free of unevenness so that in this contact area the wheel of the sensor unit can advantageously detect here a relative movement between the utility vehicle and the vehicle trailer without disruption. The mount can therefore easily be attached subsequently to an existing trailer coupling or retrofitted, without additional stability measures or complex processing of the trailer coupling being necessary.

According to one embodiment, the mount is adapted, in particular if the movable part is in the operating position, to arrange the wheel of the sensor unit outside a support face of the trailer coupling but nearer to the support face, specifically preferably at a distance from the support face of less than 0.2 m or less than 0.1 m. The distance is preferably defined as the distance between a contour of the support face and a contact face of the wheel which runs around the wheel, in order to bring about contact with the vehicle trailer.

In accordance with one embodiment, the positioning mechanism is configured to transfer the movable part of the mount out of the operating position into a position of rest and/or to support it in the position of rest which is different from the operating position and is, in particular, outside the operating position range. In this context, the position of rest is selected such that the wheel of the sensor unit which is connected to the movable part can preferably be arranged spaced apart from the vehicle trailer. This makes it possible that during the coupling and uncoupling an approaching part or coupling part of the vehicle trailer or a part or coupling part of the vehicle trailer which is moving away applies to the wheel a force which has a traverse component with respect to the rotational axis and could bring about damage.

Therefore, for coupling and uncoupling the wheel trailer the wheel can preferably be transferred into the position of rest by means of the positioning mechanism so that the vehicle trailer can be coupled to or uncoupled from the utility vehicle without damage to the sensor system.

According to one embodiment, the mount is configured to be connected in the region or to a trailer coupling which is embodied as a fifth-wheel coupling which has a fifth wheel which has a securing region and in which a kingpin can be coupled. The mount is adapted here to secure the wheel of the sensor unit at least in the operating position range at a distance from the securing range which is less than the maximum distance of a contour of the support face from the securing region.

This always ensures that in the operating position range the wheel of the sensor unit is securely in contact with a contact face of the vehicle trailer for a fifth-wheel coupling independently to the articulation angle. Use is made of the fact here that the contact face of the vehicle trailer has, for the purpose of forming contact with the fifth-wheel coupling, which can also be referred to as a region of a baseplate, at least one diameter, so that the contact face is in all cases in contact with the entire support face at the widest region of the support face. Therefore, in narrower regions of the support face in which the wheel can be arranged according to this exemplary embodiment, part of the baseplate is always connected to the wheel even when there is a rotational movement, so that the relative movement of the vehicle trailer with respect to the utility vehicle can always be measured.

According to a further embodiment, the mount is adapted to be connected in the region of with a trailer coupling, embodied as a fifth-wheel coupling, of the utility vehicle, so that by means of the movable part the wheel of the sensor unit can be arranged, at least in the operating position, in front of the support face opposite a junction area of a guide, leading to a securing region, of the fifth-wheel coupling for a kingpin or in the region of the guide. In this context, the mount is in particular adapted in such a way that, at least in the operating position, the axis of the wheel runs radially with respect to the securing region.

In this context, use is made of the knowledge that the edge of the support face or the contour of the support face, of a fifth-wheel coupling on the front side of the fifth-wheel coupling which corresponds to the side which lies in front of the support face opposite a junction region, is at a shorter distance from the securing region than on the side regions. Since the contact faces of vehicle trailers are embodied at least so large that they are in total contact with the support face of a fifth-wheel coupling, accordingly on the front side of the fifth-wheel coupling which is made less solid in order to save material there is a region present by which basically the contact face of the vehicle trailer passes. An arrangement of the wheel of the sensor unit in this region therefore ensures that even if the contact face of a vehicle trailer is just equal to the maximum width of the support face of the fifth-wheel coupling, at any rate the front region of the fifth-wheel coupling is passed by the contact face of a vehicle trailer on the support face in front of the fifth-wheel coupling when there is a relatively large rotational movement, such that the rotational movement is reliably detected by the wheel.

According to a further embodiment, the fixed part of the mount is adapted to be fastened to bolts of a fifth-wheel coupling which serve to fasten friction linings. Accordingly, bolts which are present on the fifth-wheel coupling with which friction linings are fastened and which can be easily removed in order to exchange the friction linings are used in order additionally to fasten the fixed part of the mount. Instead of the direct use of bolts which are present, these bolts are alternatively replaced by long bolts. The mount is accordingly adapted to the existing position of these bolts so that without additional further components the sensor system can easily be fastened to a fifth-wheel coupling. According to one preferred embodiment, the bolts are reinforced or lengthened by means of sleeves, in order to reduce elasticity in the mount.

According to a further embodiment, the positioning mechanism has a connecting part. The connecting part is adapted to be connected with a closing mechanism, in particular an activation lever for the closing mechanism, of the trailer coupling of the vehicle. The connecting part is therefore preferably adapted in such a way that by activating the activation lever of the closing mechanism the movable part can be transferred between an operating position and the position of rest.

It is ensured here that only if a vehicle trailer is fixedly coupled to a utility vehicle by activating the closing mechanism, automatically, specifically by means of the connecting part and the positioning mechanism, the movable part is transferred into an operating position. The sensor unit, and in particular the wheel of the sensor unit, previously remain in their position of rest, so that no contact is made between the vehicle trailer and the wheel, and thus no forces with a transverse component with respect to the rotational axis of the wheel which can possibly bring about damage to the sensor unit are applied to the wheel of the sensor unit.

According to a further embodiment, the positioning mechanism comprises an adjustment device. This adjustment device is preferably a component of the connecting part. The adjustment device serves to vary the operating position and/or the position of rest and/or the spring force during the spring mounting of the movable part. Therefore, a connecting part which is connected to a closing mechanism of a trailer coupling of a utility vehicle can be adapted to the configuration of the closing mechanism, in particular of the activation lever, and to the lever travel, so that the sensor system can be adapted for a multiplicity of different trailer couplings solely by adjustment with the adjustment device, without structural changes.

According to a further embodiment, the rotary encoder is an incremental rotary encoder, in particular an incremental encoder, or an absolute rotary encoder. Furthermore or in addition the rotary encoder is configured to output a pulse-width-modulated signal (PWM signal) with detection of the direction of propagation, in particular an A/B signal or a data signal, in particular a bus signal, preferably a CAN bus signal, as a function of a change in position.

Furthermore, the present disclosure relates to a fifth-wheel coupling system with a fifth-wheel coupling and a sensor system according to one of the abovementioned embodiments. Here, the fixed part of the mount of the sensor system is connected to the fifth-wheel coupling. Furthermore, by means of the mount at least in the operating position the wheel of the sensor unit is arranged outside a support face of the fifth-wheel coupling near to the support face. In addition, the wheel is arranged at least in the operating position with the mount outside the support face of the trailer coupling next to the support face. The wheel is preferably arranged in such a way that in the operating position the contact face of the wheel lies in a plane formed by the support face, in a region over which a baseplate of the vehicle trailer can move.

According to one embodiment of the fifth-wheel coupling system, the distance between the support face and the wheel is less than 0.2 m or less than 0.1 m.

According to one embodiment, the mount is connected in the region of or to the fifth-wheel coupling. The fifth-wheel coupling has a securing region in which a kingpin can be coupled. Furthermore, at least in the operating position, the wheel of the sensor unit is arranged by the mount at a distance from the securing region which is less than the maximum distance of a contour of the support face or fifth-wheel coupling from the securing region.

According to a further embodiment, the mount is connected in the region of or to the fifth-wheel coupling so that the wheel is arranged by the movable part of the sensor unit, at least in the operating position, in front of the support face opposite the junction region of the guide, leading to the securing region, of the fifth-wheel coupling for the kingpin or in the region of the guide. The axis of the wheel runs here, as is furthermore also the case, in particular, in other embodiments, in the operating position radially with respect to the securing region or with respect to the center, in particular with respect to an axis running through the center, of the securing region.

According to a further embodiment, the fifth-wheel coupling has a closing mechanism which is configured to couple a kingpin of a vehicle trailer to the fifth-wheel coupling or to release it. The closing mechanism is connected to the connecting part of the positioning arrangement of the sensor system.

According to a further embodiment, the fifth-wheel coupling has bolts for fastening friction linings. The fixed part of the mount is fastened to the bolt at the fifth-wheel coupling.

Furthermore, the present disclosure provides a utility vehicle having a fifth-wheel coupling system according to one of the abovementioned embodiments.

Furthermore, the present disclosure provides a method for attaching a sensor system according to one of the above-mentioned embodiments to a fifth-wheel coupling for a utility vehicle. For this purpose, the fixed part of the mount of the sensor system is connected to the bolts for fastening friction linings of the fifth-wheel coupling. Furthermore, a connecting part of the positioning arrangement is connected to a closing mechanism of the fifth-wheel coupling.

According to one embodiment of the method for arranging the sensor system, an operating position and/or a position of rest and/or a spring force of the spring are/is set during the spring mounting in the operating position of a movable part of the mount of the sensor system with an adjustment device of the sensor system.

Furthermore, the present disclosure relates to a method for coupling a semi-trailer to an articulated truck. In this context, a kingpin of a semi-trailer is firstly introduced into a fifth-wheel coupling of the articulated truck. Then, the fifth-wheel coupling is locked by means of a closing mechanism, and according to one of the abovementioned embodiments, the movable part of a mount of a sensor system is transferred from a position of rest into an operating position.

According to one embodiment of the method for coupling, the transfer of the movable part is carried out by the locking process.

Figure 1:
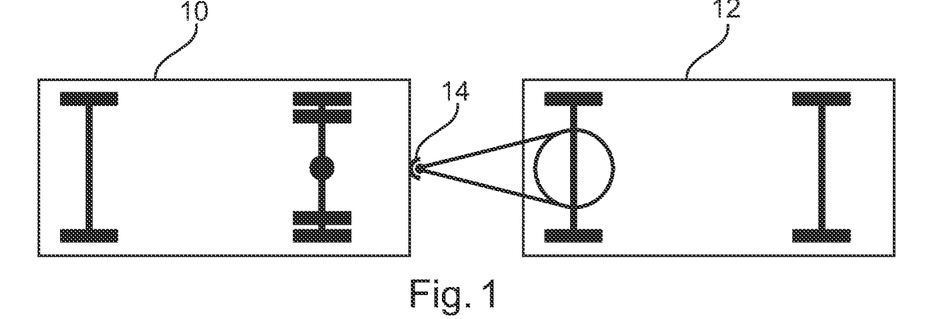
FIG. 1 shows a utility vehicle with a vehicle trailer.

FIG. 1 shows a utility vehicle 10 which is connected to a vehicle trailer 12 via a trailer coupling 14. The utility vehicle 10 has a drive (not illustrated) with which the utility vehicle 10 can be driven, and tows the vehicle trailer 12, which is coupled to it in the case of forward travel or pushes it in the case of reverse travel.

Figure 2:
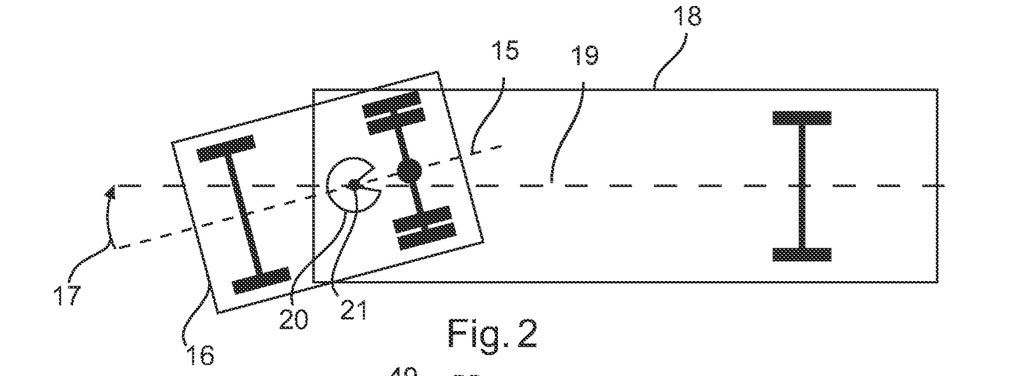
FIG. 2 shows an articulated truck with a semi-trailer.

FIG. 2 also shows a utility vehicle 10 which, however, is embodied here as a tractor 16. The tractor 16 also tows a vehicle trailer 12 which is embodied here, however, as a semi-trailer 18. The semi-trailer 18 is also coupled to the tractor 16 via a trailer coupling 14, which is embodied in FIG. 2, however, as a fifth-wheel coupling 20. The fifth-wheel coupling 20 is arranged on the tractor 16 and secures a kingpin 21 of the semi-trailer 18, so that the tractor 16 can tow the semi-trailer 18 in the case of forward travel and can push it in the case of reverse travel by means of the fifth-wheel coupling 20 and the kingpin 21 which is coupled therein. FIG. 2 shows the tractor 16 and the semi-trailer 18 during travel in a left-hand bend. This results, for example, in an angular change 17 between the tractor 16 and the semi-trailer 18. The angular change 17 is referred to as an articulation angle or change in articulation angle and corresponds to the angle between the longitudinal axes of the vehicles, that is to say the vehicle longitudinal axes, here therefore the longitudinal axis 15 of the tractor 16 and the longitudinal axis 19 of the semi-trailer 18.

Figure 3:
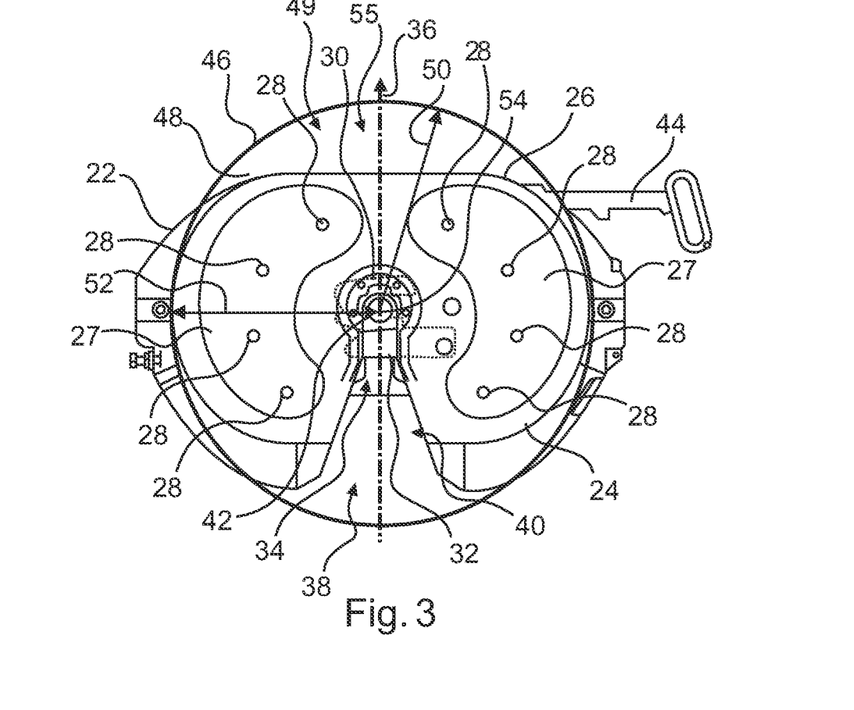
FIG. 3 shows a fifth-wheel coupling in a plan view.

FIG. 3 shows a plan view of a fifth-wheel coupling 20. The fifth-wheel coupling has a fifth wheel 22 which has a support face 24 on its upper side. The support face 24 comprises a contour 26 within which the support face 24 is preferably essentially embodied in a flat fashion. The support face 24 has friction linings 27 which are fastened with bolts 28 on the fifth wheel 22 and can be exchanged therewith. In the center of the fifth wheel 22 there is a securing region 30 provided in order to receive the kingpin 21 and couple it in the securing region 30. The coupling or securing is carried out by means of a locking bar 32 of a closing mechanism 34.

Accordingly, the kingpin 21 can be introduced into the securing region 30 in a longitudinal direction 36 via a junction region 38 and a guide 40 which adjoins the junction region 38, while the locking bar 32 is folded away. The kingpin 21 then presses on a plate 42 so that the locking bar 32 can rotate into the illustrated position. The locking bar 32 is then locked by means of an activation lever 44 via the closing mechanism 34. In order to release the kingpin 21, the activation lever 44 is in turn transferred into another position so that the locking bar 32 can fold away and the kingpin 21 can be decoupled again from the securing region 30 via the guide 40 and the junction region 38.

Furthermore, FIG. 3 shows a region 46 of a baseplate 48 which is embodied in an essentially flat fashion at the semi-trailer 18, in order to rest on the support face 24, specifically, in particular, the friction linings 27. The baseplate 48 has at least the region 46 with an essentially flat design, which has a radius 50 which corresponds to at least the maximum distance 52 between the center 54 of the securing region 30 with respect to the contour 26 of the support face 24. This ensures that during cornering at large articulation angles of the semi-trailer 18 the entire support face 24 or the friction linings 27 are always in contact with the baseplate 48. The baseplate 48 is part 49 of the controller 12. The region 46 of the baseplate 48 therefore corresponds to a region 55 of the fifth-wheel coupling 20 over which the vehicle trailer 12 always passes during cornering.

Figure 4:
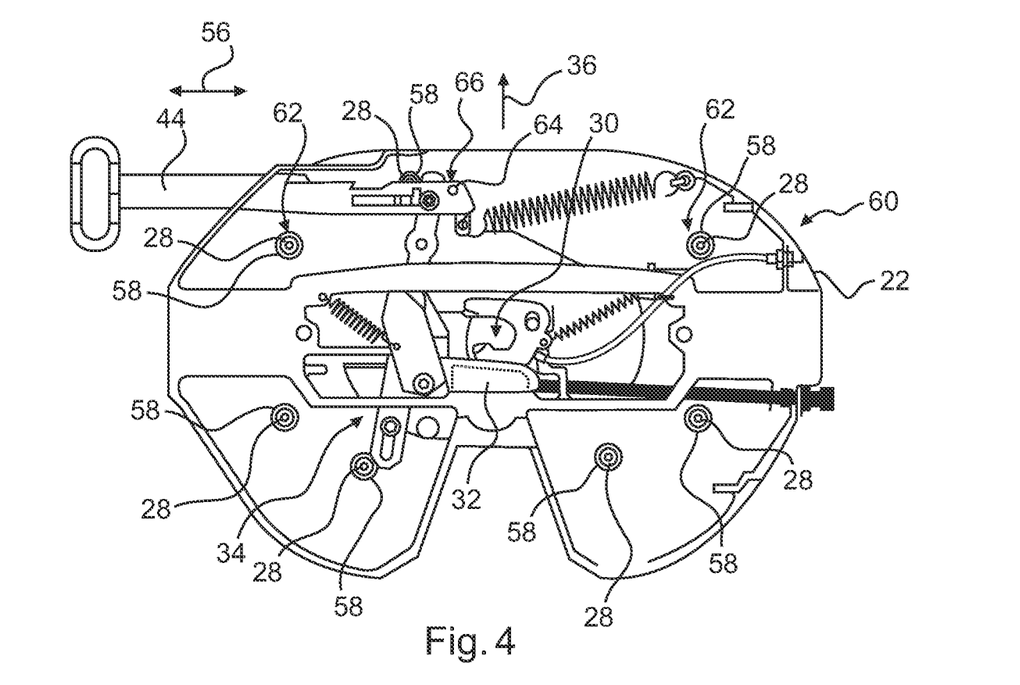
FIG. 4 shows a fifth-wheel coupling in a view from below.

FIG. 4 shows the fifth-wheel coupling 20 from the underside, wherein here the closing mechanism 34 is illustrated in more detail. Accordingly it is apparent that the activation lever 44 can move in the transverse direction 56 of the fifth wheel 22, in order to release or fix the locking bar 32 by means of various further levers. Likewise, the bolts 28, which are each secured with a nut 58 and secure the friction linings 27 on the support face 24, are illustrated in FIG. 4.

According to one exemplary embodiment, the bolts 28 in the front region 60 of the fifth-wheel coupling 20 serve as fastening points 62 for fastening a sensor system which is explained below. In addition, the activation lever 44 has an opening, in particular a drilled hole 64, which also serves to connect the activation lever 44 as a fastening point 66 for the connection of the sensor system which will be explained later.

Figure 5:
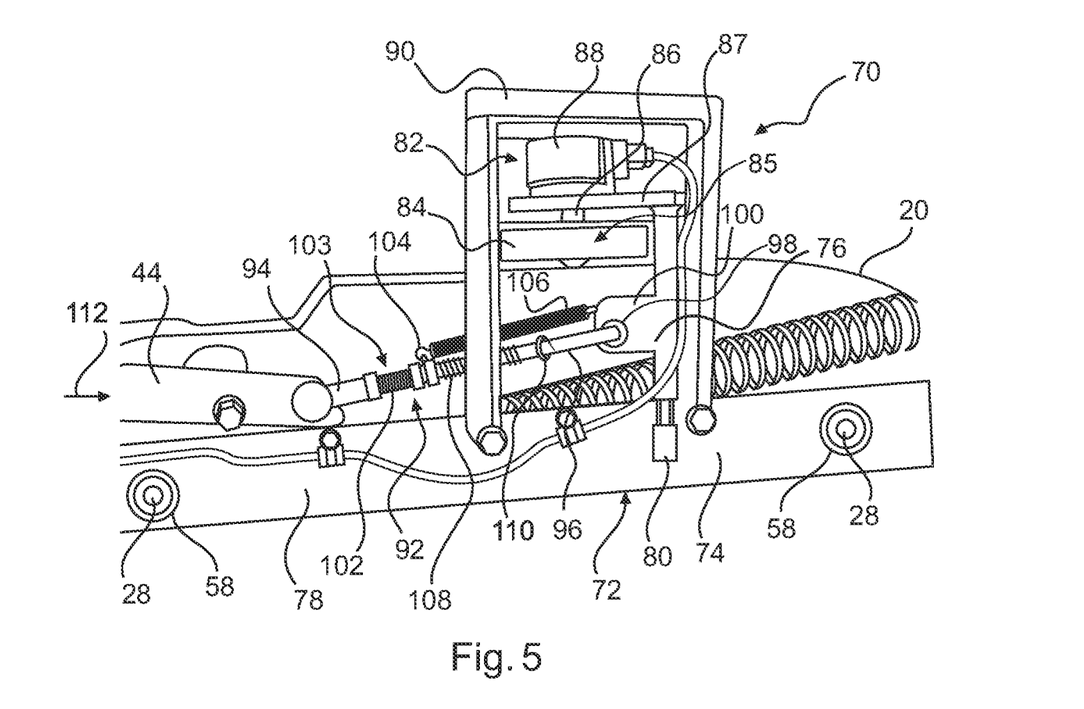
FIG. 5 shows a sensor system which is connected to the fifth-wheel coupling, in a view of the fifth-wheel coupling from below.

FIG. 5 then shows the sensor system 70, which is fastened to a fifth-wheel coupling 20, specifically in particular the bolt 28 of the fifth-wheel coupling 20 for fastening the friction linings 27 and to the activation lever 44.

The sensor system 70 comprises for this purpose a mount 72 which has a fixed part 74 and a movable part 76. The fixed part 74 comprises essentially a web 78 which is connected to both bolts 28, which serve as fastening points 62 as illustrated in FIG. 4.

The web 78 comprises a bearing 80, on which the movable part 76 is rotatably mounted. The movable part 76 is connected on one side to the bearing 80 and on the other side a sensor unit 82 is fixedly arranged. The sensor unit 82 comprises a wheel 84 which is connected to a rotary encoder 88 via an axle 86. In this context, the axle 86 leads through an opening with a bearing in a securing plate 85. The securing plate 85 can be considered to be a component of the sensor unit 82 or of the movable part 76. The wheel 84 has a circumferential contact face 85 which can be placed in contact with the vehicle trailer 12. Furthermore, protection 90 for the sensor system 70 is illustrated, which protection 90 is optionally provided and protects against undesired shocks to the sensor system 70.

Furthermore, the sensor system 70 has a positioning mechanism 92. The positioning mechanism 92 comprises a connecting part 94 which is connected to the fastening point 66 (illustrated in FIG. 4) of the activation lever 44. The connecting part 14 is connected to a rod 96 which leads through an opening 98 in a lever 100 of the movable part 76. The opening 98 has a larger diameter than the rod.

Furthermore, a region of the rod 96 is provided with a thread 102, onto which a nut 104 is screwed. A spring 106 is connected to the nut 104 and is also connected to the lever 100 of the movable part 76. The spring 106 is preferably a tension spring. A further spring 108 is arranged on the bar 96. The further spring 108 is preferably a compression spring. In addition, a disk 110 which is freely movable on the bar is arranged opposite the spring 108 with respect to the nut 104. The nut 104 and the thread 102 are parts of an adjusting device 103.

Here, FIG. 5 illustrates the movable part 76 in a position of rest in which the sensor unit 82 and the movable part 76 lie below a plane, formed by the support face 24, opposite an operating position which is shown later. This position has been assumed by the activation lever 44 being pulled downward, when viewed from the center of the fifth-wheel coupling 20. As a result, the spring 106 entrains the lever 100, so that the movable part 76 is rotated about the bearing 80, into the position of rest.

In the case shown later in which the sensor unit 82 is in an operating position, the activation lever 44 is pressed inward to the center, that is to say in the direction 112, so that the rod 96 of the positioning mechanism 92 is guided through the opening 98 via the connecting part 94, until the disk 110 is pressed against the edge of the opening 98, onto the lever 100 by the spring 108. Through further movement of the activation lever 44 in the direction 112, a force is then applied to the lever 100, which then rotates the movable part 76 with the bearing 80 about the fixed part 74. Therefore, the sensor unit 82 is as a result moved in such a way that the wheel 84 lies above a plane formed by the support face 24 of the fifth-wheel coupling 20, and the wheel 84 can enter into contact with the baseplate 48 of a semitrailer 18. In this context, the movable part 76 and the sensor unit 82 are then located in the operating position with spring loading by the spring 108.

Figure 6:
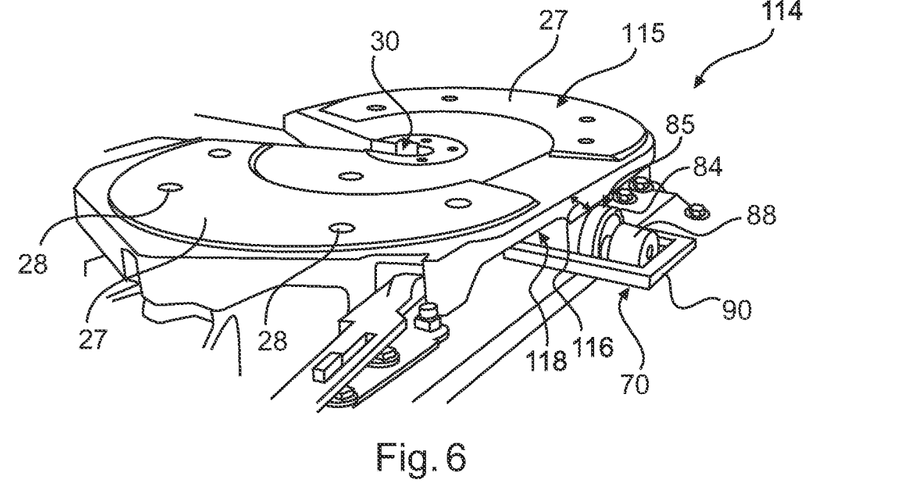
FIG. 6 shows a perspective view of a fifth-wheel coupling system.

FIG. 6 shows a perspective view of a fifth-wheel coupling system 114 which comprises the fifth-wheel coupling 20 and the sensor system 70. A particularly advantageous insulation position of the sensor system 70 in front of the fifth wheel 22 of the fifth-wheel coupling 20, that is to say on a front side 118 of the fifth-wheel coupling 20, can be seen. Accordingly, the sensor system 70 is located outside the support face 24 of the fifth-wheel coupling 20 and is arranged by the mount near to the support face 24 at a distance 116 from the support face 24 of less than 10 cm. The sensor system 70 is located here in a position of rest so that the wheel 84 lies lower than a plane 115 which is formed by the support face 24. In front of the fifth-wheel coupling 20 therefore means arranged on the front side 118 of the fifth-wheel coupling 20 which is defined as the side of the fifth-wheel coupling 20 which is arranged opposite the junction region 38 for the kingpin 21.

Figure 7:
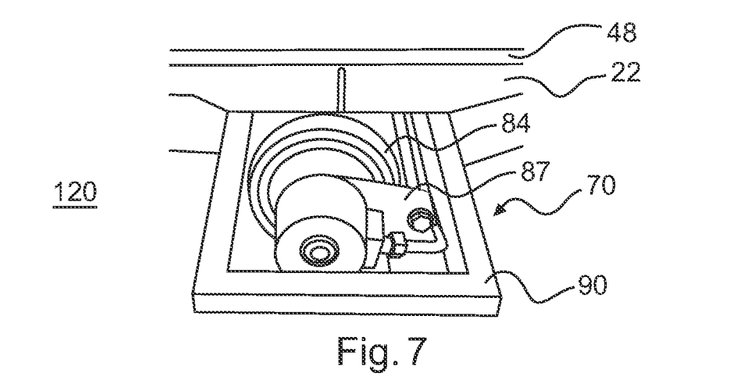
FIG. 7 shows a view of the sensor system in a position of rest.

FIG. 7 shows a further view of the sensor system 70 which is in a position of rest 120. Here, in order to clarify the position of rest 120 the baseplate 48 of a semi-trailer 18 is also illustrated, said baseplate 48 resting on the fifth wheel 22, specifically on the support face 24 of the fifth wheel 22 with the friction linings 27. The sensor unit 70 is not in contact with the baseplate 48 but rather spaced apart therefrom.

Figure 8:
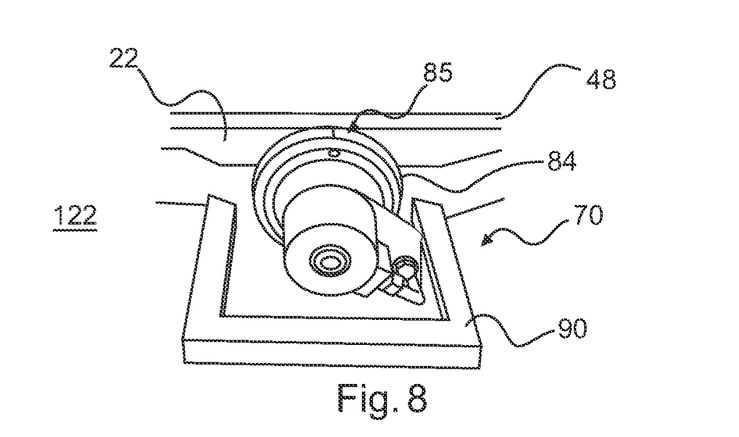
FIG. 8 shows a view of the sensor system in an operating position.

In contrast, FIG. 8 illustrates an operating position 122 in which the wheel 84 is in contact with the baseplate 48 of the semi-trailer 18. A moving baseplate 48 which rests on the support face 24 accordingly causes the wheel 84 to rotate, which can then be detected by means of the rotary encoder 88.

Figure 9:
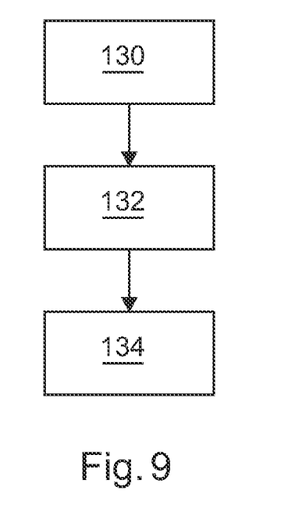
FIG. 9 shows steps of a method for attaching a sensor system to a fifth-wheel coupling.

FIG. 9 shows by way of example the steps of a method for arranging a sensor system 70. In the first step 130, a fixed part 74 of a mount 72 of the sensor system 70 is connected to bolts 28 of a fifth-wheel coupling 20. In the step 132, a connecting part 94 of a positioning mechanism 92 of the sensor system 70 is connected to a fastening point 66 of an activation lever 44 of a closing mechanism 34 of a fifth-wheel coupling 20. In step 134, a position of rest 120 and an operating position 122 are set by an adjustment mechanism 103, specifically by adjusting a nut 104 on a thread 102.

Figure 10:
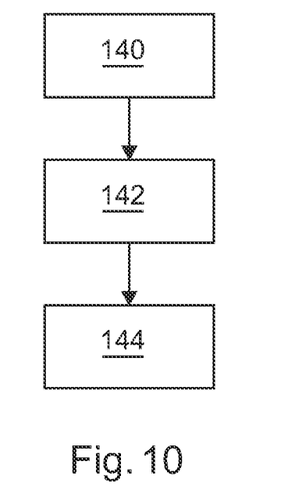
FIG. 10 shows steps of a method for coupling a vehicle trailer to a utility vehicle.

FIG. 10 shows the steps of a method for coupling a semi-trailer 18 with a tractor 16. In the step 140, a kingpin 21 of a semi-trailer 18 is moved into a securing region 30 of a fifth-wheel coupling 20 via a junction region 38 and a guide 40. In the securing region 30, the kingpin 21 is then locked 142 by means of a closing mechanism 34. In the step 144, an activation lever 44 for activating the closing mechanism 34, specifically for locking the locking bar 32, of the closing mechanism 34 is repositioned in order as a result to simultaneously transfer the sensor unit 82 and the movable part 76 of the sensor system 70 in to an operating position 122.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

10 Utility vehicle
12 Vehicle trailer
14 Trailer coupling
15 Longitudinal axis
16 Tractor
17 Angular change
18 Semi-trailer
19 Longitudinal axis
20 Fifth-wheel coupling
21 Kingpin
22 Fifth wheel
24 Support face
26 Contour
27 Friction linings 28 Bolt
30 Securing region
32 Locking bar
34 Closing mechanism
36 Longitudinal direction
38 Junction region
40 Guide
42 Plate
44 Activation lever
46 Region
48 Baseplate
50 Radius
49 Part of vehicle trailer
52 Maximum distance
54 Center
55 Region
56 Transverse direction
58 Nut
60 Front region
62 Fastening points
64 Drilled hole
66 Fastening point
70 Sensor system
72 Mount
74 Fixed part
76 Movable part
78 Web
80 Bearing
82 Sensor unit
84 Wheel
85 Contact face of wheel
86 Axis
87 Securing plate
88 Rotary encoder
90 Protection
92 Positioning mechanism
94 Connecting part
96 Rod
98 Opening
100 Lever
102 Thread
103 Adjustment device
104 Nut
106 Spring
108 Further spring
110 Disk
112 Direction
114 Fifth-wheel coupling system
115 Plane
116 Distance
118 Front side
120 Position of rest
122 Operating position
130-134 Steps of method for arranging a sensor system
140-144 Steps of method for coupling a semi-trailer

The invention claimed is:

1. A sensor system for determining an angular change between a utility vehicle having a trailer coupling and a coupled vehicle trailer, the sensor system comprising:
   a sensor unit having:
      a wheel mounted so as to be rotatable about an axis, and
      a rotary encoder connected to the wheel and configured to detect a change in position of the wheel;
   a mount having:
      at least one first fixed part configured to connect the sensor system to the utility vehicle or a part thereof, and
      at least one movable part connected to the sensor unit and mounted so as to be movable on the fixed part; and
   a positioning mechanism at least configured to provide sprung bearing of the movable part in an operating position in such a way that the wheel of the sensor unit can be moved into contact with a vehicle trailer or a part of the vehicle trailer,
   wherein the mount is adapted to arrange, at least in the operating position, the wheel of the sensor unit outside a support face of the trailer coupling, next to the support face, in such a way that in the operating position a contact face of the wheel is configured to be moved into a plane formed by the support face, into a region over which a baseplate of the vehicle trailer can move, and
   wherein the positioning mechanism is configured to transfer the movable part of the mount into a position of rest which is different from the operating position, such that the wheel of the sensor unit which is connected to the movable part of the mount can be spaced apart from the vehicle trailer.

2. The sensor system as claimed in claim 1, wherein the mount is adapted to arrange, at least in the operating position, the wheel or the contact face of the wheel at a distance of less than 0.2 m from a contour of the support face.

3. The sensor system as claimed in claim 1, wherein the mount is adapted to be connected in a region or to the trailer coupling which is embodied as a fifth-wheel coupling and which has a fifth wheel which has a securing region and in which a kingpin is configured to be coupled, wherein the mount is adapted to secure the wheel of the sensor unit at least in the operating position at a distance from the securing region which is less than the maximum distance of a contour of a support face of the fifth wheel from the securing region.

4. The sensor system as claimed in claim 1, wherein the mount is adapted to be connected in a region or to the trailer coupling, embodied as a fifth-wheel coupling, of the utility vehicle, so that by means of the movable part the wheel of the sensor unit can be arranged, at least in the operating position, in front of the support face opposite a junction area of a guide, leading to the securing region, of the fifth-wheel coupling for a kingpin or in the guide, in such a way that, at least in the operating position, the axis of the wheel runs radially with respect to the center of the securing region.

5. The sensor system as claimed in claim 1, wherein the fixed part of the mount is adapted to be fastened with bolts of the fifth-wheel coupling which serve to fasten friction linings.

6. The sensor system as claimed in claim 1, wherein the positioning mechanism has a connecting part, and the connecting part is adapted to be connected to a closing mechanism, to an activation lever for the closing mechanism, of the trailer coupling of the utility vehicle, in such a way that when the activation lever of the closing mechanism is activated the movable part can be transferred between the operating position and the position of rest.

7. The sensor system as claimed in claim 1, wherein the positioning mechanism comprises an adjusting device configured to change at least the operating position and/or the position of rest.

8. A fifth-wheel coupling system of a utility vehicle, the utility vehicle having a fifth-wheel coupling and a sensor system as claimed in claim 1, wherein the fixed part of the sensor system is connected to the utility vehicle or to a part thereof, and at least in the operating position the wheel is arranged with the mount outside the support face of the trailer coupling, next to the support face, such that in the operating position a contact face of the wheel lies in a plane formed by the support face, in a region over which a baseplate of the vehicle trailer can move.

9. The fifth-wheel coupling system as claimed in claim 8, wherein the mount arranges the wheel or the contact face of the wheel, at least in the operating position, at a distance from a contour of the support face of less than 0.2 m or less than 0.1 m.

10. The fifth-wheel coupling system as claimed in claim 8, wherein the mount of the sensor unit is connected in the region or to the fifth-wheel coupling, and the fifth-wheel coupling has a fifth wheel with a securing region into which a coupling kingpin is configured to be coupled, wherein the mount secures the wheel in the operating position at a distance from the securing region which is less than the maximum distance of the contour of the support face from the securing region.

11. The fifth-wheel coupling system as claimed in claim 8, wherein the fifth-wheel coupling is connected to the mount in such a way that at least in the operating position the wheel is arranged in front of the support face opposite the junction region of a guide, leading to the securing region, of the fifth-wheel coupling or in the guide, wherein the axis of the wheel runs, in particular, radially with respect to the center of the securing region.

12. The fifth-wheel coupling system as claimed in claim 8, wherein the fifth-wheel coupling has a closing mechanism, and the closing mechanism is configured to couple or release a kingpin of a semi-trailer to or from the fifth-wheel coupling, and the closing mechanism is connected to a connecting part of the positioning mechanism of the sensor system and/or
wherein the fifth-wheel coupling has bolts for fastening friction linings, and the fixed part of the mount is fastened to the bolts on the fifth-wheel coupling.

13. A utility vehicle, having a fifth-wheel coupling system as claimed in claim 8.

14. A method for arranging a sensor system as claimed in claim 1 on a fifth-wheel coupling for a utility vehicle, the method comprising:
connecting the fixed part of the mount of the sensor system to bolts for fastening friction linings of the fifth-wheel coupling, and
connecting a connecting part of the positioning mechanism to a closing mechanism of the fifth-wheel coupling.

15. The method as claimed in claim 14, wherein after the connecting process the operating position and/or a position of rest are/is set with an adjustment device.

16. A method for coupling a semi-trailer to a tractor, the method comprising:
introducing a kingpin of the semi-trailer into a securing region of a fifth-wheel coupling of the tractor,
locking a closing mechanism of the fifth-wheel coupling, and
transferring the movable part of a mount of a sensor system as claimed in claim 1 from a position of rest into the operating position.

17. The method as claimed in claim 16, wherein the transfer of the movable part is brought about by locking the kingpin.

18. A sensor system for determining an angular change between a utility vehicle having a trailer coupling and a coupled vehicle trailer, the sensor system comprising:
a sensor unit having:
a wheel mounted so as to be rotatable about an axis, and
a rotary encoder connected to the wheel and configured to detect a change in position of the wheel;
a mount having:
at least one first fixed part configured to connect the sensor system to the utility vehicle or a part thereof, and
at least one movable part connected to the sensor unit and mounted so as to be movable on the fixed part; and
a positioning mechanism at least configured to provide sprung bearing of the movable part in an operating position in such a way that the wheel of the sensor unit can be moved into contact with a vehicle trailer or a part of the vehicle trailer,
wherein the mount is adapted to arrange, at least in the operating position, the wheel of the sensor unit outside a support face of the trailer coupling, next to the support face, in such a way that in the operating position a contact face of the wheel is configured to be moved into a plane formed by the support face, into a region over which a baseplate of the vehicle trailer can move, and
wherein the positioning mechanism has a connecting part, and the connecting part is adapted to be connected to a closing mechanism, to an activation lever for the closing mechanism, of the trailer coupling of the utility vehicle, in such a way that when the activation lever of the closing mechanism is activated the movable part can be transferred between the operating position and the position of rest.

\* \* \* \* \*